(12) United States Patent
Whitby-Strevens (10) Patent No.: US 7,502,338 B1
(45) Date of Patent: Mar. 10, 2009

(54) DE-EMPHASIS TRAINING ON A POINT-TO-POINT CONNECTION

(75) Inventor: Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 1066 days.

(21) Appl. No.: 10/742,719

(22) Filed: Dec. 19, 2003

(51) Int. Cl.
H04B 3/20 (2006.01)

(52) U.S. Cl. ...................................... 370/292; 375/219

(58) Field of Classification Search ................. 370/338, 370/229, 331–334, 401, 282, 292; 375/219, 375/295, 316
See application file for complete search history.

(56) References Cited

U.S. PATENT DOCUMENTS

| | | | | |
|---|---|---|---|---|
| 4,156,798 | A | 5/1979 | Doelz | 179/15 AL |
| 4,194,113 | A | 3/1980 | Fulks et al. | 371/20 |
| 4,489,416 | A * | 12/1984 | Stuart | 375/231 |
| 5,014,262 | A | 5/1991 | Harsharardhana | 395/200 |
| 5,274,631 | A | 12/1993 | Bhardwaj | 370/60 |
| 5,285,474 | A * | 2/1994 | Chow et al. | 375/231 |
| 5,321,812 | A | 6/1994 | Benedict et al. | 709/223 |
| 5,343,461 | A | 8/1994 | Barton et al. | 370/13 |
| 5,394,556 | A | 2/1995 | Oprescu | 395/800 |
| 5,406,643 | A | 4/1995 | Burke et al. | 395/200 |
| 5,452,330 | A | 9/1995 | Goldstein | 375/257 |
| 5,490,253 | A | 2/1996 | Laha et al. | 395/304 |
| 5,495,481 | A | 2/1996 | Duckwall | 370/85.2 |
| 5,524,254 | A | 6/1996 | Morgan et al. | 395/800 |
| 5,533,062 | A * | 7/1996 | Liberti et al. | 375/334 |
| 5,539,390 | A | 7/1996 | Nagano et al. | 340/825.07 |
| 5,541,670 | A | 7/1996 | Hanai | 348/705 |
| 5,568,641 | A | 10/1996 | Nelson et al. | 395/700 |
| 5,583,922 | A | 12/1996 | Davis et al. | 379/96 |
| 5,630,173 | A | 5/1997 | Oprescu | 395/860 |
| 5,632,016 | A | 5/1997 | Hoch et al. | 395/200.02 |
| 5,640,595 | A | 6/1997 | Baugher et al. | 395/830 |
| 5,642,515 | A | 6/1997 | Jones et al. | 395/727 |

(Continued)

FOREIGN PATENT DOCUMENTS

EP     1 085 706 A2     3/2001

(Continued)

OTHER PUBLICATIONS

Bregni et al., Jitter Testing Technique and Results at VC-4 Desynchronizer Output of SDH Equipment, *IEEE International Conference on Communications*, vol. 3, pp. 1407-1410, May 12, 1994.

(Continued)

*Primary Examiner*—Ricky Ngo
*Assistant Examiner*—Ben H Liu
(74) *Attorney, Agent, or Firm*—Gazdzinski & Associates, PC (57) ABSTRACT

A method for establishing data transmission between a two devices by performing de-emphasis training is disclosed. While a retry count does not exceed a predetermined threshold: a training pattern with a signal strength is sent from a first device to a second device. If a negative acknowledgement is received from the second device within enough time to determine that the send training pattern was unacceptable to the second device, the retry count is incremented, the signal strength for the training pattern is attenuated and the training pattern is resent.

30 Claims, 6 Drawing Sheets

U.S. PATENT DOCUMENTS

| | | | |
|---|---|---|---|
| 5,654,657 A | 8/1997 | Pearce | 327/163 |
| 5,659,581 A * | 8/1997 | Betts et al. | 375/296 |
| 5,684,715 A | 11/1997 | Palmer | 364/514 C |
| 5,701,476 A | 12/1997 | Fenger | 395/652 |
| 5,701,492 A | 12/1997 | Wadsworth et al. | 395/712 |
| 5,706,278 A | 1/1998 | Robillard et al. | 370/222 |
| 5,712,834 A | 1/1998 | Nagano et al. | 369/19 |
| 5,719,862 A | 2/1998 | Lee et al. | 370/355 |
| 5,754,765 A | 5/1998 | Danneels et al. | 395/200.1 |
| 5,764,930 A | 6/1998 | Staats | 395/287 |
| 5,784,648 A | 7/1998 | Duckwall | 395/860 |
| 5,802,048 A | 9/1998 | Duckwall | 370/389 |
| 5,802,057 A | 9/1998 | Duckwall et al. | 370/408 |
| 5,802,365 A | 9/1998 | Kathail et al. | 395/681 |
| 5,805,073 A | 9/1998 | Nagano et al. | 340/825.07 |
| 5,809,331 A | 9/1998 | Staats et al. | 395/830 |
| 5,826,027 A | 10/1998 | Pedersen et al. | 395/200.51 |
| 5,832,298 A | 11/1998 | Sanchez et al. | 395/828 |
| 5,835,761 A | 11/1998 | Ishii et al. | 395/653 |
| 5,845,152 A | 12/1998 | Anderson et al. | 395/872 |
| 5,867,730 A | 2/1999 | Leyda | 395/830 |
| 5,875,301 A | 2/1999 | Duckwall et al. | 395/200.51 |
| 5,923,633 A | 7/1999 | Ando | 370/445 |
| 5,930,480 A | 7/1999 | Staats | 395/200.74 |
| 5,935,208 A | 8/1999 | Duckwall et al. | 709/221 |
| 5,938,764 A | 8/1999 | Klein | 713/1 |
| 5,940,600 A | 8/1999 | Staats et al. | 395/287 |
| 5,954,796 A | 9/1999 | McCarty et al. | 709/222 |
| 5,968,152 A | 10/1999 | Staats | 710/104 |
| 5,970,052 A | 10/1999 | Lo et al. | 370/241 |
| 6,009,124 A * | 12/1999 | Smith et al. | 375/267 |
| 6,091,766 A * | 7/2000 | Yoshida | 375/231 |
| 6,314,170 B1 * | 11/2001 | Noguchi et al. | 379/93.32 |
| 6,353,868 B1 | 3/2002 | Takayama et al. | 710/129 |
| 6,356,558 B1 | 3/2002 | Hauck et al. | 370/450 |
| 6,363,085 B1 | 3/2002 | Samuels | 370/502 |
| 6,373,821 B2 | 4/2002 | Staats | 370/252 |
| 6,385,679 B1 | 5/2002 | Duckwall et al. | 710/119 |
| 6,405,247 B1 | 6/2002 | Lawande et al. | 709/221 |
| 6,411,628 B1 | 6/2002 | Hauck et al. | 370/447 |
| 6,418,150 B1 * | 7/2002 | Staats | 370/503 |
| 6,425,019 B1 | 7/2002 | Tateyama et al. | 710/11 |
| 6,426,946 B1 * | 7/2002 | Takagi et al. | 370/252 |
| 6,426,962 B1 | 7/2002 | Cabezas et al. | 370/516 |
| 6,442,630 B1 | 8/2002 | Takayama et al. | 710/105 |
| 6,446,142 B1 | 9/2002 | Shima et al. | 710/16 |
| 6,452,975 B1 | 9/2002 | Hannah | 375/257 |
| 6,457,086 B1 | 9/2002 | Duckwall | 710/305 |
| 6,466,982 B1 | 10/2002 | Ruberg | 709/227 |
| 6,496,862 B1 | 12/2002 | Akatsu et al. | 709/224 |
| 6,513,085 B1 | 1/2003 | Gugel et al. | 710/305 |
| 6,519,657 B1 | 2/2003 | Stone et al. | 710/10 |
| 6,529,522 B1 | 3/2003 | Ito et al. | 370/466 |
| 6,574,588 B1 | 6/2003 | Shapiro et al. | 703/24 |
| 6,587,904 B1 | 7/2003 | Hauck et al. | 710/107 |
| 6,591,300 B1 | 7/2003 | Yurkovic | 709/226 |
| 6,606,320 B1 | 8/2003 | Nomura et al. | 370/395.1 |
| 6,618,750 B1 | 9/2003 | Staats | 709/209 |
| 6,618,785 B1 | 9/2003 | Whitby-Streves | 710/305 |
| 6,628,607 B1 | 9/2003 | Hauck et al. | 370/216 |
| 6,636,914 B1 | 10/2003 | Johas Teener | 710/240 |
| 6,643,714 B1 | 11/2003 | Chrysanthakopoulos | 710/8 |
| 6,671,768 B1 | 12/2003 | Brown | 711/102 |
| 6,879,630 B2 * | 4/2005 | Kokuryo et al. | 375/231 |
| 6,934,345 B2 * | 8/2005 | Chu et al. | 375/346 |
| 7,010,607 B1 * | 3/2006 | Bunton | 709/228 |
| 7,058,146 B2 * | 6/2006 | Paulraj et al. | 375/347 |
| 7,079,528 B2 * | 7/2006 | Ziegler et al. | 370/352 |
| 7,136,438 B2 * | 11/2006 | Doi | 375/347 |
| 7,155,249 B2 * | 12/2006 | Sarkar et al. | 455/522 |
| 7,199,615 B2 * | 4/2007 | Stojanovic et al. | 326/82 |
| 7,236,451 B2 * | 6/2007 | De Francesco et al. | 370/208 |
| 2001/0001151 A1 | 5/2001 | Duckwall et al. | 710/8 |
| 2001/0019561 A1 | 9/2001 | Staats | 370/487 |
| 2001/0024423 A1 | 9/2001 | Duckwall et al. | 370/254 |
| 2002/0057655 A1 | 5/2002 | Staats | 370/256 |
| 2002/0085581 A1 | 7/2002 | Hauck et al. | 370/442 |
| 2002/0101231 A1 | 8/2002 | Staats | 324/126 |
| 2002/0103947 A1 | 8/2002 | Duckwall et al. | 710/19 |
| 2002/0188780 A1 | 12/2002 | Duckwall | 710/105 |
| 2002/0188783 A1 | 12/2002 | Duckwall et al. | 710/105 |
| 2003/0016621 A1 * | 1/2003 | Li | 370/203 |
| 2003/0037161 A1 | 2/2003 | Duckwall et al. | 709/233 |
| 2003/0055999 A1 | 3/2003 | Duckwall et al. | 709/236 |
| 2003/0177436 A1 * | 9/2003 | Gruhn et al. | 714/776 |
| 2004/0213361 A1 * | 10/2004 | Chen et al. | 375/340 |
| 2004/0258020 A1 * | 12/2004 | Hayata | 370/331 |
| 2005/0134305 A1 * | 6/2005 | Stojanovic et al. | 326/31 |
| 2005/0213505 A1 * | 9/2005 | Iochi et al. | 370/236 |
| 2006/0067387 A1 * | 3/2006 | Ahmed et al. | 375/219 |

FOREIGN PATENT DOCUMENTS

EP   1 085 706 A3   10/2002

OTHER PUBLICATIONS

"Information technology-Microprocessor systems—Control and Status Registers (CSR) Architecture for microcomputer buses", ANSI/IEEE Standard 1212, The Institute of Electrical and Electronics Engineers, Inc. pp. I-122, 1994 Edition.

Bregni et al., Jitter Testing Technique and Results at VC-4 Desynchronizer Output of SDH Equipment, *IEEE Transactions on Instrumentation and Measurement*, vol. 44, Issue 3, pp. 675-678, Jun. 1995.

"IEEE Standard for a High Performance Serial Bus", IEEE Standard 1394-1995, Institute of Electrical and Electronics Engineers, Inc., pp. I-384, approved Jul. 22, 1996.

Shiwen et al., Parallel Positive Justification in SDH C_4 Mapping, *IEEE International Conference on Communications*, vol. 3, pp. 1577-1581, Jun. 12, 1997.

"AV/C Digital Interface Command Set General Specification, Rev. 3.0", 1394 Trade Association, pp. 4-5, 20-34, Apr. 15, 1998.

"Enhancements to the AV/C General Specification 3.0 Version 1.0FC1", 1394 Trade Association, pp. 4, 6-17, Nov. 5, 1998.

"Information Technology-Fibre Channel-Methodologies for Jitter Specification", NCITS TR-25-1999, Jitter Working Group Technical Report, Rev. 10, pp. 1-96, Jun. 9, 1999.

"P1394a Draft Standard for a High Performance Serial Bus (Supplement)", Draft 3.0, Institute of Electrical and Electronics Engineers, Inc., pp. 1-187, Jun. 30, 1999.

"IEEE Standard for a High Performance Serial Bus-Amendment 1", Institute of Electrical and Electronics Engineers, Inc., pp. 1-196, approved Mar. 30, 2000.

P1394b IEEE Draft Standard for a High Performance Serial Bus (High Speed Supplement) P1394b Draft 1.3.3, Institute of Electrical and Electronics Engineers, Inc., pp. 1-408, Nov. 16, 2001.

"IEEE Standard for a High Performance Serial Bus-Amendment 2", Institute of Electrical and Electronics Engineers, Inc., pp. 1-369, 2002 (no month).

* cited by examiner

DE-EMPHASIS TRAINING ON A POINT-TO-POINT CONNECTION

FIELD

The present invention relates broadly to data transmission between devices. Specifically, the present invention relates to adaptive de-emphasis training of devices to facilitate data transmission between the devices.

BACKGROUND

The IEEE 1394b serial bus protocol provides protocols and arbitration mechanisms for transmission speeds up to "S3200," which translates to 4 GBaud over a connecting cable due to 8B10B encoding.

However, the IEEE 1394b standard does not provide the details for the electrical signaling, due to lack of sufficient experience/evidence etc at the time the standard was prepared.

The electrical specifications for the IEEE 1394 family of protocols need to use some form of "de-emphasis" to overcome issues of intersymbol interference (ISI). ISI describes the degradation of signal quality on a transmission line due to frequency-dependent attenuation within the transmission line—typically higher frequencies are attenuated more than lower frequencies. This phenomenon is similar to an instance where bass notes from a loud in-car entertainment system can be heard as the car passes by, but no other music accompanying the bass can be heard. Typically in digital transmission a sequence of bits of the same value generates, in effect, a lower frequency signal that affects the following bit if this is a single bit, which generates a higher frequency signal. The results are typically measured at the receiver by means of an eye diagram that overlays a large number of received signals, aligned such that the center of the bit time for each signal is coincident. If there is no signal degradation, at the center time all the signals will be high or low (depending on whether a "1" bit or a "0" bit is being transmitted), resulting in a wide-open "eye." If signal degradation occurs, then at the center of the bit time some of the signals will not be so high or low and the eye will be less open. If the eye is fully closed, then it is impossible to determine whether the transmitted bits are 1 or 0 without at least some contextual information.

De-emphasis is a technique in which a PHY's transmitter modifies the amplitude of the signal for various runlengths of multiple identical bits so that the signal as received at the receiver is free of apparent ISI. Essentially, the transmitter pre-compensates for the ISI that is introduced as the signal traverses the cable. There is an alternative technique of equalization in the receiver that applies to DSP techniques for extracting contextual information, but for various technical reasons, the technique is less favored.

The amount of de-emphasis to apply in any particular case is likely to depend on the attenuation properties of the particular cable being used. With very short cables, there may be little or no de-emphasis required, whereas with long cables a considerable amount of de-emphasis may be appropriate. The consequence is that it is necessary to perform some form of training of the transmitter when a connection is established. Such training enables the transmitter to determine how much de-emphasis to apply for the actual cable being used in the connection. The use of de-emphasis determined as the result of analysis of the particular connection is generally known as adaptive de-emphasis.

At relatively low transmission rates, de-emphasis is not required. At somewhat faster transmission rates, fixed de-emphasis is adequate. But for higher performance, a connection requires some form of adaptive de-emphasis. Furthermore, a connection is clearly much more robust with some form of adaptive de-emphasis. However, there are no effective adaptive de-emphasis methods because training has proven to be difficult and complex, and this was one reason why there was no specification included in 1394b for signaling at the S3200 rate. A prior approach has been to utilize the existing connection negotiation signaling in 1394b. In such an approach, a receiving node analyzes the signal (referred to as connection tones) to determine the amount of desired de-emphasis. However, this approach suffers significant shortcomings. Each tone comprises a relatively low frequency signal. Hence the bit patterns sent during existing connection negotiation signaling are not suitable for analysis to determine the amount of high frequency attenuation inherent in the transmission line (and hence the amount of de-emphasis to be applied), as they are of too low frequency, and even if such analysis could be performed by the receiver, there is no way to communicate the result of any such analysis to the transmitter. Thus, there is a heartfelt need for a de-emphasis training mechanism that works effectively.

SUMMARY OF THE INVENTION

The present invention solves the problems discussed above by providing adaptive de-emphasis training between a transmitting node and a receiving node. In one aspect, the invention provides a method for establishing data transmission between a two devices by performing de-emphasis training, the method comprising: while a retry count does not exceed a predetermined threshold: sending with a signal strength a training pattern from a first device to a second device; receiving negative acknowledgement from the second device within enough time to determine that the send training pattern was unacceptable to the second device; incrementing a retry count; and attenuating the signal strength; and if the retry count exceeds the predetermined threshold, then perform remedial action to improve data transmission between the first and second devices.

In another aspect, the present invention provides a method for establishing data transmission between two devices by performing de-emphasis training, the method comprising: while a training pattern counter does not exceed a predetermined threshold: sending a training pattern from a first device to a second device; verifying the absence of a negative acknowledgement sent from the second device; incrementing a training pattern counter; and modifying the training pattern.

In yet another aspect, the present invention provides a method for establishing data transmission between two devices by performing de-emphasis training, the method comprising: while a training pattern counter does not exceed a predetermined threshold: sending a training pattern from a first device to a second device; verifying the absence of a negative acknowledgement sent from the second device; incrementing a training pattern counter; and modifying the training pattern.

In still yet another aspect, the present invention provides a method of establishing data transmission between two devices by performing de-emphasis training, the method comprising: a) performing speed negotiation between a first device and a second device; b) synchronizing the first and second devices; c) selecting a de-emphasis training pattern and de-emphasis level; d) until all de-emphasis training patterns to be sent from the first device to the second device are sent: 1) until all de-emphasis levels to be tried for a given training pattern have not been sent from the first device to the second device: i) transmitting the de-emphasis pattern from the first device to the second device at the selected de-emphasis level; ii) analyzing an incoming bit stream to determine signal quality; iii) changing de-emphasis level for the training pattern; and iv) resending the training pattern with the changed de-emphasis level; 2) changing the de-emphasis pattern to be sent; e) setting an acceptable de-emphasis level based on the analyzed bit streams; and f) transmitting symbols from the first device to the second device using the acceptable de-emphasis level.

In another aspect, the present invention provides a method of establishing data transmission between two devices by performing de-emphasis training, the method comprising: a) performing speed negotiation between a first device and a second device; b) synchronizing the first and second devices; c) selecting a de-emphasis training pattern and de-emphasis level; d) until all de-emphasis training patterns to be sent from the first device to the second device are sent: 1) until all de-emphasis levels to be tried for a given training pattern have not been sent from the first device to the second device: i) transmitting the de-emphasis pattern from the first device to the second device at the selected de-emphasis level; ii) analyzing an incoming bit stream to determine signal quality; iii) unless the analysis identifies an acceptable de-emphasis level, changing de-emphasis level for the training pattern and resending the training pattern with the changed de-emphasis level; 2) resetting the de-emphasis level changing the de-emphasis pattern to be sent; e) setting an acceptable de-emphasis level based on the analyzed bit streams; and f) transmitting symbols from the first device to the second device using the acceptable de-emphasis level.

In various embodiments, the methods of the present invention are implemented on devices that are operable on a wide variety of serial or parallel point-to-point electrical connections. Other features and advantages of the present invention will become apparent to one skilled in the art upon reading the detailed description below, when considered in conjunctions with the accompanying drawings, in which:

DETAILED DESCRIPTION

In an embodiment, the present invention provides a set of training bit patterns and a protocol that allows a receiving node to communicate to a transmitting node the quality of the signal is which it is currently receiving. The transmitting node varies the amount of de-emphasis that it applies, and selects an optimal amount according to the feedback received from the receiver.

Techniques utilized by the present invention are suitable for a wide variety of serial or parallel point-to-point electrical connections. Within the subset of serial connections, the IEEE 1394b standard is discussed below for exemplary purposes. In this standard, communication between a port on one device and a port on another device takes place in both directions simultaneously and independently. It is necessary to achieve reliable communications in both directions, and training in both directions proceeds simultaneously (when a new connection is made, or after the second of the two ports is powered on or otherwise enabled).

Figure 1:
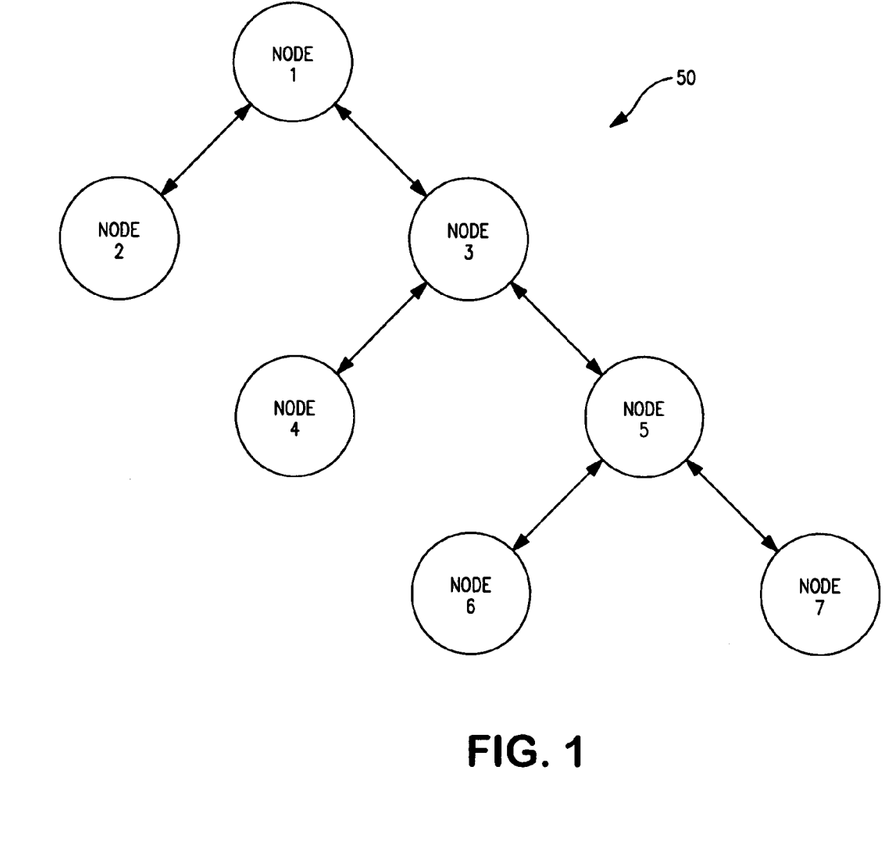
FIG. 1 illustrates an exemplary network of node devices utilized in embodiments of the present invention.

Referring to FIG. 1, an IEEE 1394 network 50 comprises one or more "nodes," node 1-node 7. A node represents an electronic device(s) with an IEEE 1394 bus interface. A node device may comprise a computer, a digital camera, a digital video recorder, a DVD player, or another type of device having a suitable bus interface. Each node couples to at least one other node. As shown in the exemplary architecture of FIG. 2, node 1 couples both to nodes 2 and 3. Node 3, in turn, couples to nodes 4, and 5 and node 5 also couples to nodes 6 and 7. In general, each node can transmit data to any other node in the network. For example, node 7 can transmit data to node 2, but the transmitted data will pass from node 7 to node 5 to node 3 to node 1 and then, to node 2.

Figure 2:
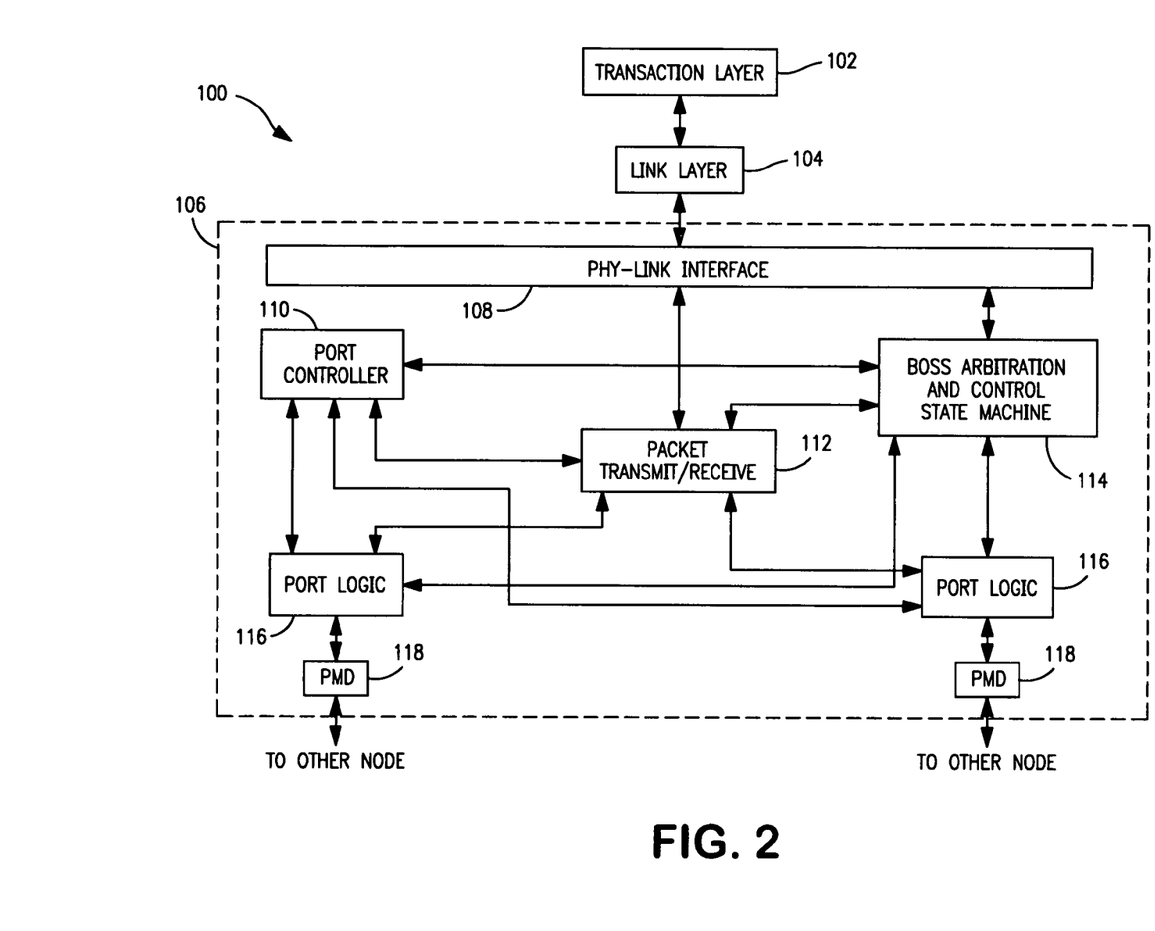
FIG. 2 illustrates in greater detail a node device depicted in FIG. 1.

Referring to FIG. 2, node 100 generally comprises three layers: transaction layer 102, link layer 104 and physical layer 106 (referred to as a "PHY 106"). Transaction layer 102 implements the request-response protocol required to conform to the IEEE 1394 standard in accordance with known techniques. Link layer 104 supplies an acknowledgment to the transaction layer. Link layer 104 handles all packet transmission and reception responsibilities as well as the provision of cycle control for isochronous channels. The PHY 106 generally provides the initialization and arbitration services necessary to assure that only one node at a time is sending data and to translate the serial bus data stream and signal levels to those required by the link layer logic 104. PHY 106 also implements the arbitration scheme of the preferred embodiment of the invention.

Feedback training is utilized in embodiments of the present invention where signal deterioration is asymmetric, i.e. the signal degradation in one direction is different from the signal degradation in the opposite direction. In this case, the amount of de-emphasis to be applied at the transmitter for communication in one direction will be different from the de-emphasis to be applied at the transmitter for the opposite direction. Directing attention to FIG. 3A, according to an embodiment of the present invention, a node transmits a particular training pattern for an arbitrary number (n) of symbols (act 300), but the receiving node, if it decides the eye is insufficient, interrupts its transmission of a training pattern and transmits a small number of bytes of negative acknowledgement (NACK). In a preferred embodiment, the NACK appears as a series of alternating bits. In preferred embodiments, between approximately two and four symbols are sufficient for this NACK. IN accordance with various embodiments, the NACK symbol is chosen so that it is recognizable as such, despite the maximum amount of ISI to be tolerated and can always be distinguished from the ISI training patterns. This is not to say that it has to be received correctly, but rather the NACK symbol is capable of being distinguished from other patterns used for training received across the range of ISI to be tolerated. Possible choices include 10101010, or a pattern with no high frequency content, such as 11110000, or 1111111111 followed by 0000000000. It should be noted that it is important to maintain DC balance to avoid excessive baseline wander, thus the NACK should have the same number of 1's as 0's.

Figure 3A:
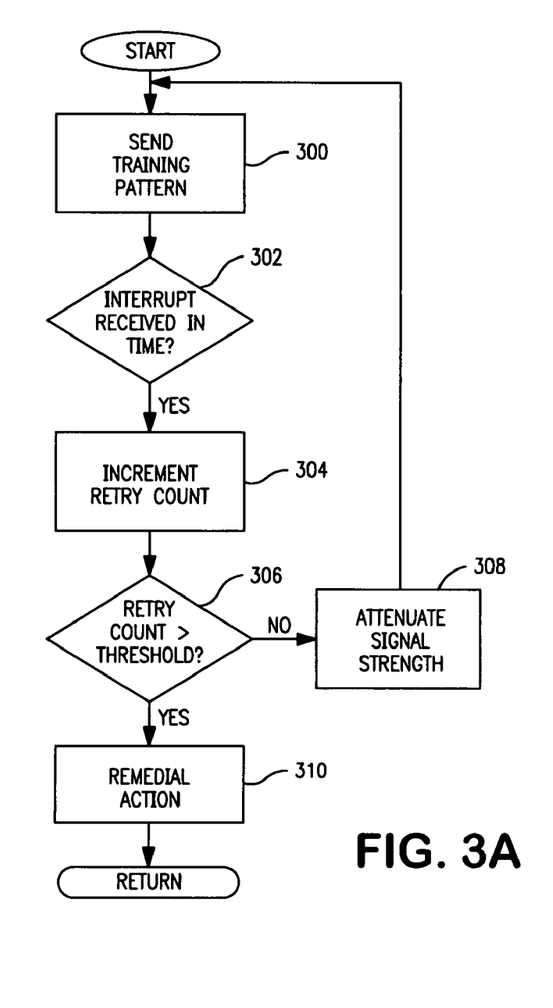
FIGS. 3A-3C illustrate various sequences of acts executed in accordance with embodiments of the present invention where signal deterioration is asymmetric.

If the interrupt is received within a predetermined amount of time (decision act 302), control proceeds to act 304, where a retry count is incremented. In an embodiment, the receiving node sends the interrupt before approximately half of the n symbols are received, so that the transmitting node will receive this feedback before it completes the transmission of the entire set of n symbols. The lack of any such feedback within this time allows the transmitting node to assume that the correct amount of de-emphasis is being applied. In another embodiment, a value based on round trip time, determined by an extension to this protocol which first sends a test signal and measures the time for a response plus a few clocks, can be substituted for the value represented by half of the n symbols to allow enough time for the transmitter to receive the feedback. The receiving node then resumes transmitting the training pattern it was previously transmitting to allow training to be continued in the opposite direction.

At decision act 306, if the retry counter value is less than a predetermined threshold, control transitions to act 308, where the transmitting changes its de-emphasis attenuation of the training pattern. Control returns to act 300, where the training pattern is sent again. In an embodiment utilizing the S3200 speed mode of the IEEE 1394b serial bus protocol, three pre-determined levels of de-emphasis cover all possible amounts of signal attenuation from compliant cables, and so the transmitter picks a value as yet untried. In other embodiments, more preset values may be appropriate. Control loops through acts 300-308 until the retry counter value exceeds a threshold value, at which time control transitions to act 310, where the connection is deemed unreliable and remedial action is taken. Remedial action can include lowering the transmission speed, reporting failure to management software, triggering a timeout interval, and the like.

Figure 3B:
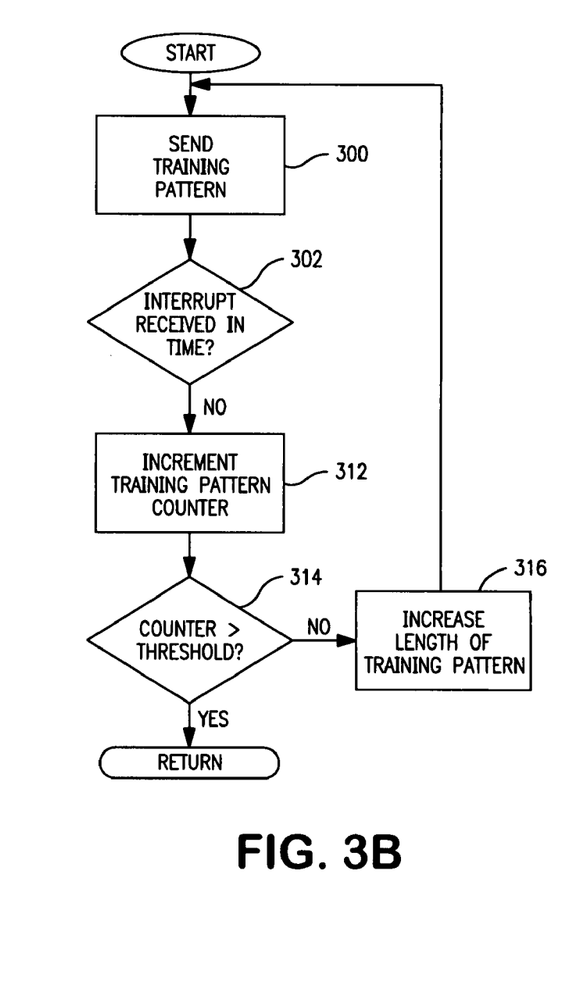
Figure 3C:
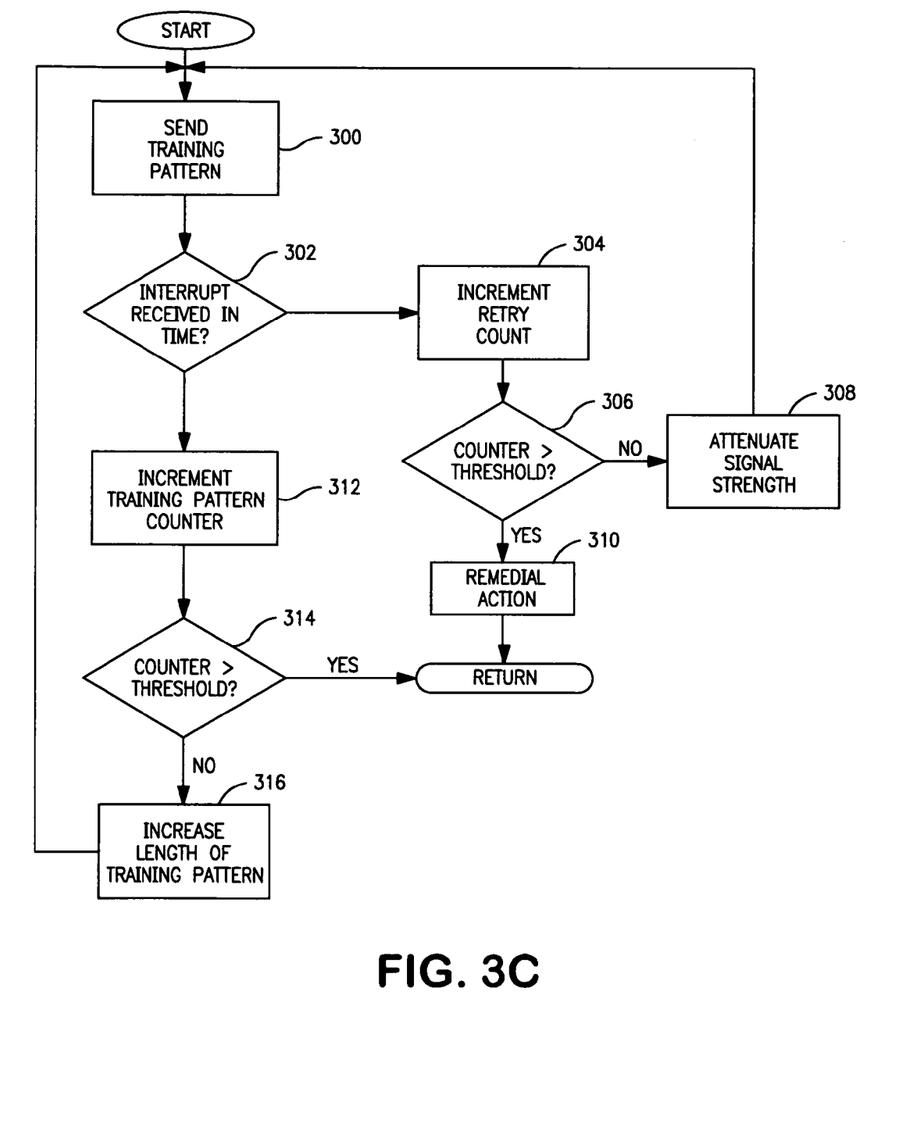

Directing attention to FIG. 3B, in another embodiment, if the node transmitting a particular training pattern does not receive a NACK by the time it has completed transmitting n symbols (decision act 302), then it increments a training pattern counter at act 312. If the training pattern counter does not exceed a predetermined threshold value (decision act 314) the length of the training pattern is increased (act 316) and control returns to act 300, where the longer training pattern is transmitted. Control loops through acts 300-314 until the training pattern counter value exceeds the threshold value, at which time training is complete. The transmitting node then begins transmission of normal 1394b symbols. In an embodiment, training continues until the transmitting node decides that the receiving node has also trained its transmitter. This determination is made because the incoming signal is deemed acceptable and the receiving node has not had to send a NACK. In this embodiment, feedback is provided in two directions and can be different for each direction. In an embodiment, after interrupting a particular training pattern with a NACK, the training pattern is restarted, so the receiving node has a complete contiguous set of symbols on which to examine the eye. In another embodiment, the methods illustrated in FIGS. 3A and 3B can also be combined as illustrated in FIG. 3C.

Figure 4A:
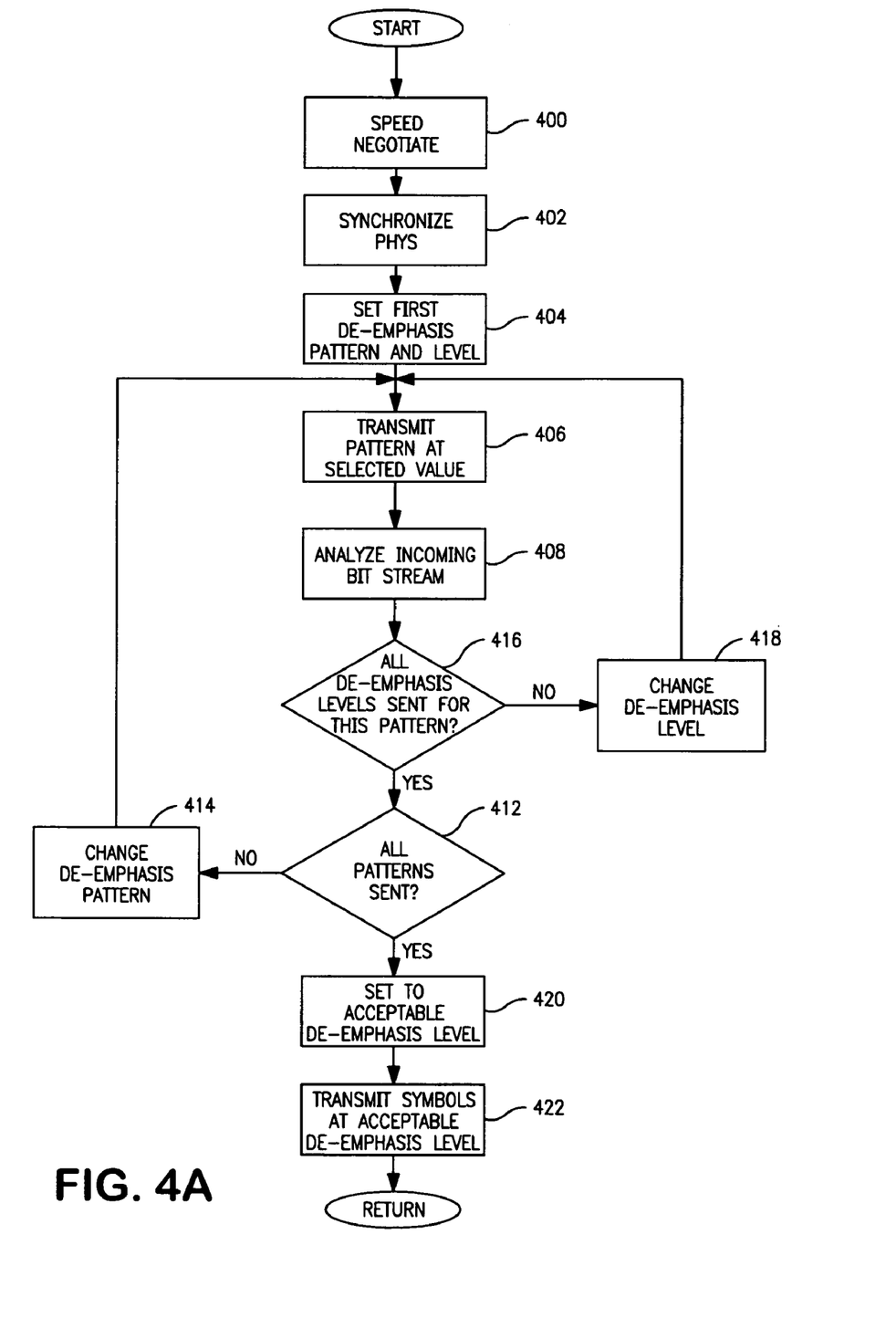
FIGS. 4A and 4B illustrate sequences of acts executed in accordance with embodiments of the present invention where signal deterioration is substantially symmetric.

Directing attention to FIG. 4A, in another embodiment of the present invention, where signal deterioration is symmetric, de-emphasis training can be achieved through the following acts. At act 400, two 1394b PHYs speed negotiate and discover that they are both capable of a common data rate, i.e. S3200. At act 402, the two PHYs transmit synchronization training patterns to synchronize their respective receivers to the incoming bit patterns. In an embodiment, the phase locked loop (PLL) is locked into the received clock signal in order to recover the clock being used at the peer transmitter. This ensures that bits are received correctly. The two PHYs may start transmitting their respective clocks at a time interval up to 42 msec apart, due to the asynchronous nature of the preceding speed negotiation algorithm. After starting to send the clock training pattern, each PHY waits until a clock training pattern is received correctly from the other PHY. Each PHY then waits an additional 500 microseconds to ensure that its PLL is stable, At act 404, the de-emphasis training pattern is selected with a de-emphasis level to be tried. In an embodiment, a "bit 2" de-emphasis training sequence of alternating pairs of identical bits, such as 11001100, is selected as the first de-emphasis training pattern to be tried. In an embodiment, the "bit 2" sequence for is sent for approximately 512 to approximately 1024 bit times. Additional training patterns can include larger numbers of repeating bits, such as 111000111000 or 1111000011110000, and the like. These additional training patterns can be selected so that the number of repeating bits increases incrementally with each iteration of acts illustrated in FIGS. 4A and 4B. In an embodiment, the selected training pattern can be sent initially with no de-emphasis.

At act 406, the de-emphasis training pattern is sent with the selected level of de-emphasis. The incoming bit stream is analyzed at act 408. In an embodiment, the eye opening on the incoming bit stream is analyzed, and a determination is made as to whether the tried de-emphasis level is acceptable. In an embodiment, an acceptable level of de-emphasis can be determined from the receipt or absence of a NACK from the other PHY during the training pattern receipt period. In additional embodiments, analysis can include various digital and/or analog techniques, such as applying an extra margin on the PHY's receiver before evaluating received signal quality. At decision act 416, if all de-emphasis levels for the selected training pattern have not been tried, control transitions to act 418, where a different de-emphasis level is selected for the training pattern. In an embodiment, the amount of de-emphasis to be applied to the transmitter can be determined by analysis of the received signal, as it is known what training symbol the receiver is transmitting due to the symmetric nature of the algorithm (both ports send the same training sequence). Control then loops back to act 406, where the training pattern is again tried, this time with a different de-emphasis level. Returning to decision act 416, if all de-emphasis levels have been tried for the training pattern, control continues to decision act 412. If all patterns have not been sent, the different training pattern is selected and the de-emphasis level reset to its initial level at act 414. Control returns to act 406, where the new training pattern is sent at the reset de-emphasis level. Returning to decision act 412, if all training patterns have been sent, control transitions to act 420 where an acceptable de-emphasis is selected, and normal 1394-compliant symbols are transmitted using the acceptable de-emphasis level at act 422.

In an alternative embodiment (FIG. 4B), a decision act 410 can be added to streamline the de-emphasis training process. In this embodiment, all training patterns are still sent, but a determination (decision act 410) is made as to whether a tried de-emphasis level is acceptable, and preempts further testing of the particular training pattern at additional de-emphasis levels.

Figure 4B:
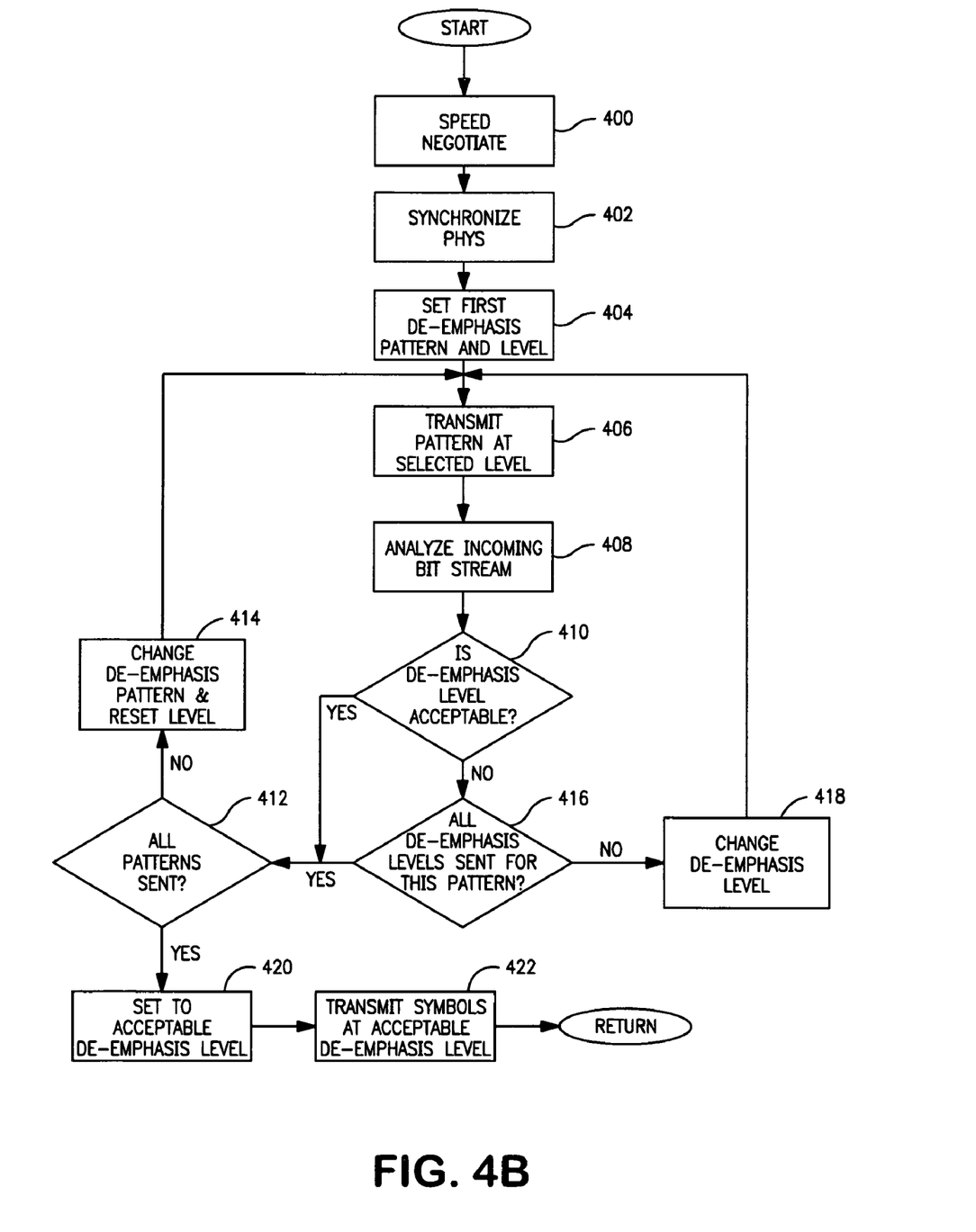

In an embodiment, failure can be recognized at the end of the de-emphasis training methods illustrated in FIGS. 4A and 4B. This determination can be made from analyzing the eye pattern in act 408 and determining that all de-emphasis levels tried for the training patterns are unacceptable. As a result of this determination, a slower transmission speed, such as S1600 can be selected and the de-emphasis training methods described above can be repeated at this slower speed.

In an embodiment, the present invention provides calculations for cable length and resulting round trip delays. For example, while the 1394b cable/connector specification for the IEEE 1394b standard supports an inexpensive 4.5 m cable, users desire longer cables with a different construction that still meet the same cable budget parameters. Allowing for a 10 m cable delay, where a signal travels at a rate of 5 ns per meter, the end-to end delay is of the order of 50 ns in each direction. Thus, by this example, 200 bits at S3200 can be in flight on the cable at any given time. The time allowed in the 1394b spec for phase lock loop (PLL) synchronization, plus other negotiation, is approximately 1 ms. The speed negotiation algorithm operates at 25 Hz, and is asynchronous. Thus, one node can decide to start sending training symbols some 42 msec before the peer port starts sending its training symbols, and analyzing the incoming training symbols.

The PHY's receiver always knows what the transmitter is transmitting at any given moment in time to within a degree of accuracy defined by round trip delay. This is partly a property of what is determined from analyzing the incoming stream (the actual pattern of 1's and 0's), and partly (the de-emphasis applied) inferred from what the receiving node is receiving.

While various embodiments of de-emphasis training methods in accordance with the present invention have been illustrated and described above, it is to be understood that many modifications can be made to specific embodiments of the present invention without departing from the spirit thereof.

What is claimed is:

1. A method for establishing data transmission between two devices by performing de-emphasis training, the method comprising:
   while a retry count does not exceed a predetermined threshold:
      sending with a signal strength a training pattern from a first device to a second device;
      receiving negative acknowledgement from the second device within enough time to determine that the sent training pattern was unacceptable to the second device;
      incrementing a retry count; and
      attenuating the signal strength; and
   if the retry count exceeds the predetermined threshold, then perform remedial action to improve data transmission between the first and second devices.

2. The method of claim 1, wherein the negative acknowledgement is derived from evaluating an eye pattern derived from a data stream received by the second device, the data stream approximating the transmitted training pattern.

3. The method of claim 1, wherein the remedial action performed comprises slowing a transmission speed between the two devices.

4. The method of claim 1, wherein the remedial action performed comprises reporting a failure to a device management software.

5. The method of claim 1, wherein the remedial action performed comprises triggering a timeout condition.

6. The method of claim 1, wherein the negative acknowledgement comprises a pattern of alternating bit values.

7. The method of claim 1, wherein the negative acknowledgement comprises a pattern without high frequency content.

8. The method of claim 6, wherein the negative acknowledgement comprises a number of a first bit followed by the same number of a second bit, the second bit opposite from the first bit.

9. A method for establishing data transmission between two devices by performing de-emphasis training, the method comprising:
   while a training pattern counter does not exceed a predetermined threshold:
      sending a training pattern from a first device to a second device;
      verifying the absence of a negative acknowledgement sent from the second device;
      incrementing a training pattern counter; and
      modifying the training pattern.

10. The method of claim 9, wherein the act of modifying the training pattern comprises lengthening the training pattern.

11. A method for establishing data transmission between two devices by performing de-emphasis training, the method comprising:
   while a training pattern counter does not exceed a predetermined threshold:
      sending a training pattern from a first device to a second device;
      verifying the absence of a negative acknowledgement sent from the second device;
      incrementing a training pattern counter; and
      modifying the training pattern.

12. The method of claim 11, wherein the negative acknowledgement is derived from evaluating an eye pattern derived from a data stream received by the second device, the data stream approximating the transmitted training pattern.

13. The method of claim 11, further comprising performing a remedial action if the training pattern counter exceeds the predetermined threshold, said remedial action comprising slowing a transmission speed between the two devices.

14. The method of claim 11, further comprising performing a remedial action if the training pattern counter exceeds the predetermined threshold, said remedial action comprising reporting a failure to a device management software.

15. The method of claim 11, further comprising performing a remedial action if the training pattern counter exceeds the predetermined threshold, said remedial action comprising triggering a timeout condition.

16. The method of claim 11, wherein the negative acknowledgement comprises a pattern of alternating bit values.

17. The method of claim 11, wherein the negative acknowledgement comprises a pattern without high frequency content.

18. The method of claim 17, wherein the negative acknowledgement comprises a number of a first bit followed by the same number of a second bit, the second bit opposite from the first bit.

19. The method of claim 11, wherein the act of modifying the training pattern comprises lengthening the training pattern.

20. A method of establishing data transmission between two devices by performing de-emphasis training, the method comprising:
   a) performing speed negotiation between a first device and a second device;
   b) synchronizing the first and second devices;
   c) selecting a de-emphasis training pattern and de-emphasis level;
   d) until all de-emphasis training patterns to be sent from the first device to the second device are sent:
      1) until all de-emphasis levels to be tried for a given training pattern have not been sent from the first device to the second device:
         i) transmitting the de-emphasis pattern from the first device to the second device at the selected de-emphasis level;
         ii) analyzing an incoming bit stream to determine signal quality;

iii) changing de-emphasis level for the training pattern; and iv) resending the training pattern with the changed de-emphasis level;

2) changing the de-emphasis pattern to be sent;

e) setting an acceptable de-emphasis level based on the analyzed bit streams; and f) transmitting symbols from the first device to the second device using the acceptable de-emphasis level.

21. The method of claim 20, wherein the de-emphasis level selected in act c) comprises no de-emphasis.

22. The method of claim 20, wherein the act of synchronizing comprises sending a synchronizing training pattern from the first device to the second device.

23. The method of claim 20, wherein the act of analyzing the incoming bit stream comprises:

applying a margin to a receiver on the first device, the receiver receiving the incoming bit stream; and evaluating signal quality of the incoming bit stream received by the receiver.

24. A method of establishing data transmission between two devices by performing de-emphasis training, the method comprising:

a) performing speed negotiation between a first device and a second device;

b) synchronizing the first and second devices;

c) selecting a de-emphasis training pattern and de-emphasis level;

d) until all de-emphasis training patterns to be sent from the first device to the second device are sent:

1) until all de-emphasis levels to be tried for a given training pattern have not been sent from the first device to the second device:

i) transmitting the de-emphasis pattern from the first device to the second device at the selected de-emphasis level;

ii) analyzing an incoming bit stream to determine signal quality;

iii) unless the analysis identifies an acceptable de-emphasis level, changing de-emphasis level for the training pattern and resending the training pattern with the changed de-emphasis level;

2) resetting the de-emphasis level changing the de-emphasis pattern to be sent;

e) setting an acceptable de-emphasis level based on the analyzed bit streams; and f) transmitting symbols from the first device to the second device using the acceptable de-emphasis level.

25. The method of claim 24, wherein the de-emphasis level selected in act c) comprises no de-emphasis.

26. The method of claim 24, wherein the act of synchronizing comprises sending a synchronizing training pattern from the first device to the second device.

27. The method of claim 24, wherein the act of analyzing the incoming bit stream comprises:

applying a margin to a receiver on the first device, the receiver receiving the incoming bit stream; and evaluating signal quality of the incoming bit stream received by the receiver.

28. A method for establishing data transmission between devices by de-emphasis training, the method comprising:

sending with a signal strength a training pattern from a first device to a second device;

receiving information from the second device, the information indicative that the sent training pattern was unacceptable to the second device;

incrementing a retry count;

reducing the signal strength; and when the retry count exceeds the predetermined threshold, performing remedial action to improve data transmission between the first and second devices.

29. A method for establishing data transmission between devices by de-emphasis training, the method comprising:

while a counter does not exceed a predetermined threshold:

sending a training pattern from a first device to a second device;

determining the absence of information sent from the second device, said information indicating that the sent training pattern was unacceptable to the second device;

incrementing said counter; and based at least in part on said determining the absence, modifying the training pattern.

30. A method of establishing data transmission between devices via de-emphasis training, the method comprising:

selecting a first de-emphasis training pattern to be sent between a first device and a second device;

transmitting the de-emphasis pattern from the first device to the second device at a first selected de-emphasis level;

analyzing an incoming bit stream associated with said transmitted pattern to determine signal quality;

changing the de-emphasis level for the training pattern based at least in part on said analyzing;

resending the training pattern with the changed de-emphasis level; and repeating said acts of analyzing, changing and resending at different de-emphasis levels so as to identify and acceptable de-emphasis level based on the analyzed bit streams; and transmitting symbols from the first device to the second device using the acceptable de-emphasis level.

* * * * *